(No Model.)
E. WESTON.
REGULATOR FOR DYNAMO OR MAGNETO ELECTRIC MACHINES.
No. 289,325. Patented Nov. 27, 1883.
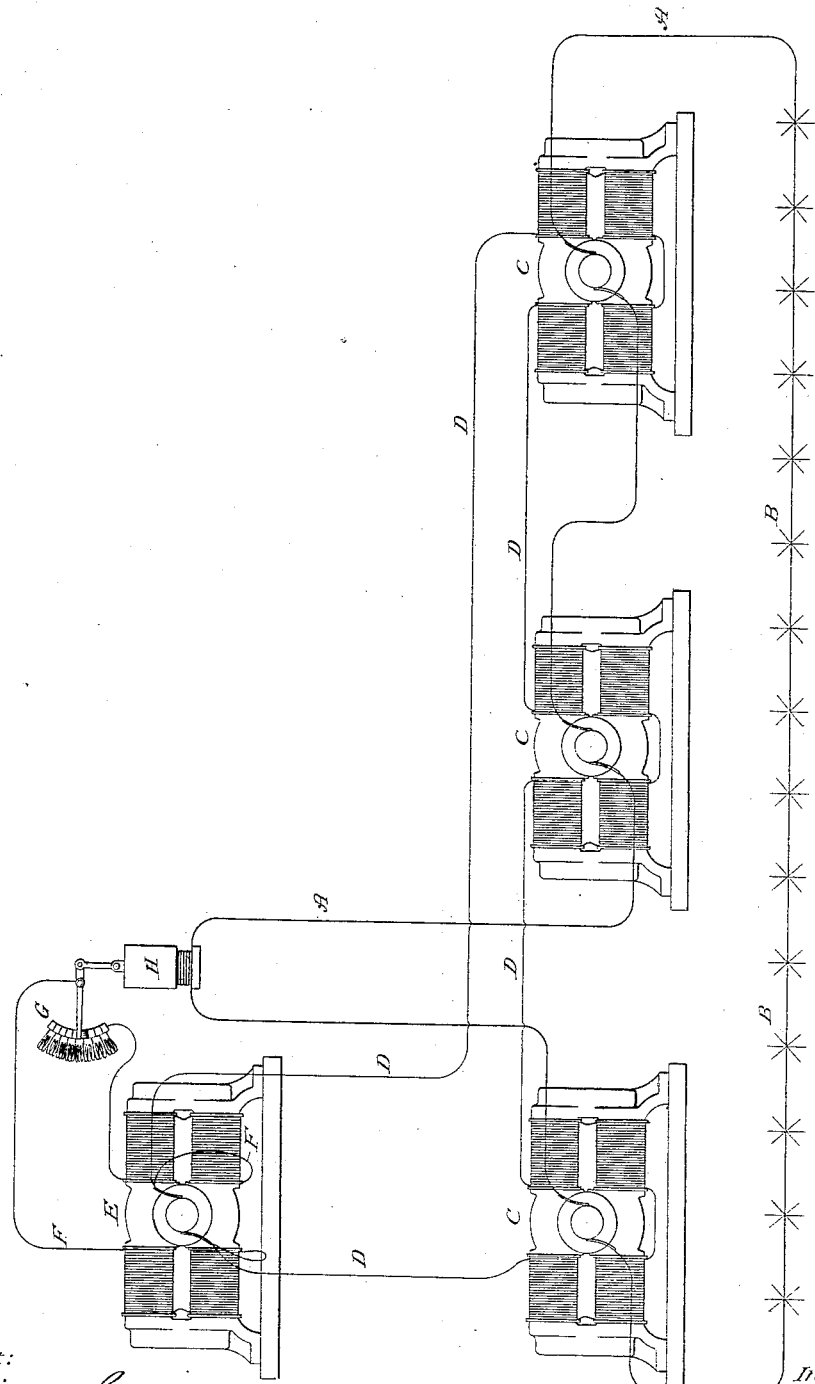

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

REGULATOR FOR DYNAMO OR MAGNETO ELECTRIC MACHINES.

SPECIFICATION forming part of Letters Patent No. 289,225, dated November 27, 1883.

Application filed July 16, 1883. (No model.)

*To all whom it may concern:*

Be it known that I, EDWARD WESTON, a subject of the Queen of Great Britain, residing at Newark, in the county of Essex and State of New Jersey, have invented certain new and useful Improvements in Regulators for Dynamo or Magneto Machines, of which the following is a specification, reference being had to the drawing accompanying and forming a part of the same.

My present invention pertains to systems for controlling or regulating the current developed by two or more dynamo or magneto electric machines when connected up in series and run conjointly for such purposes as electric-arc lighting, or the like, where it is desirable to produce a high electro-motive force and to maintain at all times a constant or uniform flow of current.

In the machines which I have invented and employ, the armature and field circuits of a machine, when run alone, are in derivation. To regulate the current of a single machine, therefore, I include in the derived field-circuit a variable resistance, and in the main or armature circuit an electro-magnet, which, through the instrumentality of any proper mechanism, is caused to vary the resistance, so as to preserve a uniform flow of current on the line. When two or more machines are connected in series, however, for producing a higher electro-motive force, the limits of regulation are greatly extended, and obstacles arise in the way of effecting the regulation on this principle which add to the expense and difficulty of maintaining a uniform current. I have overcome these difficulties by certain methods of regulation, which I have described in other applications for Letters Patent, and also by the plan which forms the subject of this application, and which I will now describe by reference to the accompanying drawing, which is a diagram of a system invented by me.

Let A A designate an electric circuit, and B B a given number of arc-lamps or other electrical devices included in series in said circuit. In order to run the lamps properly, it may be necessary to connect up several generators in series, in which case I provide for the regulation of the current in the following manner:

C C C designate a given number of generators with their armatures connected up in series with the line A A. The field-circuits of these machines are independent of the armature-circuits, and are connected in series with a circuit, D, in which is included a dynamo, E, which, for convenience, is designated the "exciter." This latter machine has a field-circuit of relatively high resistance, which is in derivation to its armature-circuit, and at some point in the derived field-circuit F is included a variable resistance, G. In the main circuit A is an electro-magnet, H, the armature of which is connected with mechanism of any proper or well-known description for operating or varying the resistance G by introducing more resistance in the circuit F as the attraction of the magnet increases, and conversely. With this arrangement, if the resistance of the main line should be decreased—as, for example, by the withdrawal of one or more of the lamps—the tendency to an increase of current is prevented by the action of the magnet H, which operates to interpose more resistance in the circuit F, and thereby reduce the amount of current produced by the exciter E, and, consequently, to weaken the fields of the series of machines C C sufficiently to maintain the flow of current uniform. The converse of this of course occurs when the current on the main line weakens, as by the insertion of more resistance. In this way a single electro-magnet and resistance or rheostat is rendered capable of controlling the current from a number of powerful generators.

In practice it is desirable to employ, in lieu of the simple electro-magnet H and the resistance G, a rheostat operated by some means independent of the magnet, and only controlled by the varying attractive power of the magnet. Such devices are now used for purposes analogous to the present, an efficient form of the same being described in a patent granted to me, No. 278,640, May 29, 1883.

Having now described my invention, and reserving the right to make subject of other applications features of novelty herein shown or described but not claimed, what I now claim is—

1. The combination, with two or more electrical generators, having their armatures and field-coils connected in series in independent circuits, of a generator in the field-circuit, an electro-magnet in the main circuit in series with the armatures of the generators, and means operated or controlled thereby for varying the current in the field-circuit, substantially as herein set forth.

2. The combination, with two or more electrical generators, having their field and armature coils connected in series in independent circuits, of a derived field-circuit generator in the field-circuit, a variable resistance in said derived field-circuit, and an electro-magnet in the main circuit in series with the armatures of the generators for varying the said resistance, as and for the purpose specified.

3. In a system of electric-arc lighting, the combination of a main circuit, lamps connected in series therewith, two or more generators with their armature-coils connected up in series with the lamps, an independent circuit including the field-magnet coils of the generators in series, a derived field-circuit generator for energizing the said fields, a variable resistance or rheostat in the derived field-circuit, and an electro-magnet in the main circuit in series with the lamps and generator-armatures for operating or controlling the said resistance and maintaining a uniform flow of current through the lamps.

In testimony whereof I have hereunto set my hand this 14th day of July, 1883.

EDWARD WESTON.

Witnesses:
HENRY A. BECKMEYER,
L. V. E. INNES.